E. BAILLAT.
MEANS FOR INDICATING FAULTS AND BREAKS IN ELECTRIC CONDUCTORS.
APPLICATION FILED MAY 4, 1914.
1,168,587.
Patented Jan. 18, 1916.
2 SHEETS—SHEET 1.
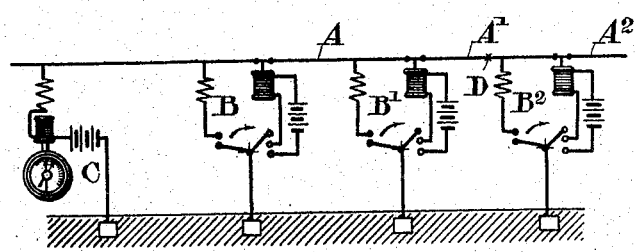
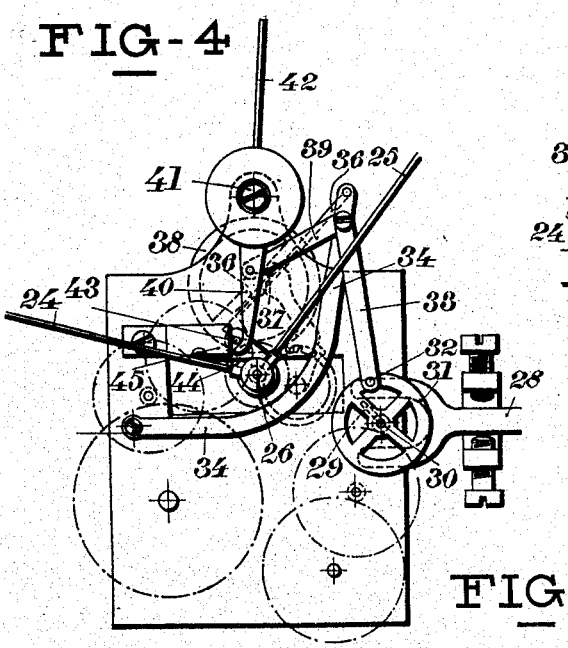
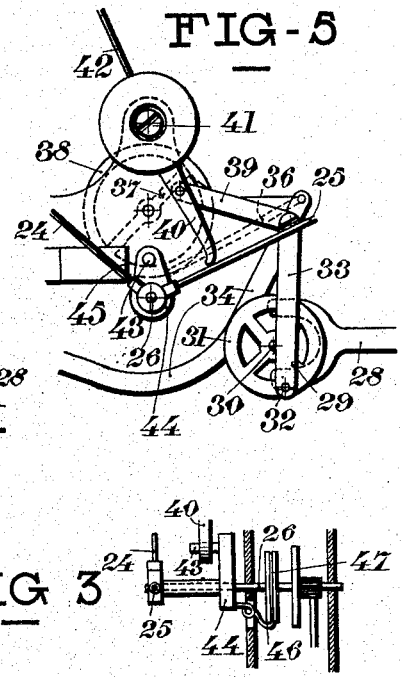
Witnesses
Inventor
Ernest Baillat

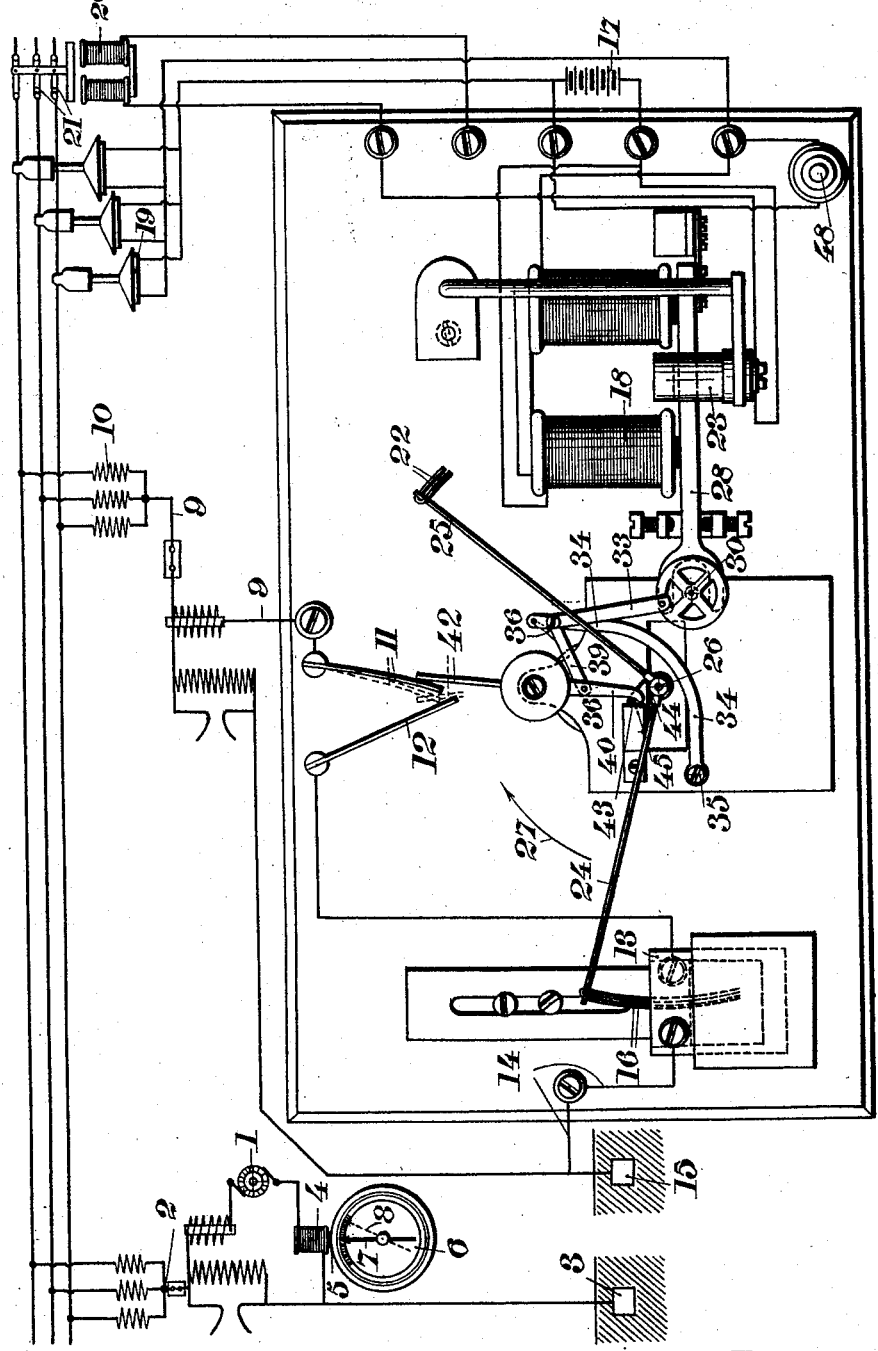

UNITED STATES PATENT OFFICE.

ERNEST BAILLAT, OF PONT DE BEAUVOISIN, FRANCE.

MEANS FOR INDICATING FAULTS AND BREAKS IN ELECTRIC CONDUCTORS.

1,168,587.   Specification of Letters Patent.   Patented Jan. 18, 1916.

Application filed May 4, 1914. Serial No. 836,269.

*To all whom it may concern:*

Be it known that I, ERNEST BAILLAT, a citizen of the French Republic, residing at Pont de Beauvoisin, France, have invented certain new and useful Improvements in Means for Indicating Faults and Breaks in Electric Conductors, of which the following is a specification.

This invention relates to means for indicating faults in electric conductors carrying alternating currents, the characteristic novel feature residing in the fact that an indicating device and a circuit breaking device act independently of each other and are operated by a continuous current of very low value sent over the line by the known method of employing the neutral point of a transformer.

The system is divided into sections, at the head of each of which is provided a station comprising a transmitter, which closes the continuous current circuit of an indicating apparatus arranged at the head of the line, and a circuit breaker. These devices become operative when, owing to a fault in the section, the current attains an excessive value. They have the following functions:
1. The transmitter renders operative for a given time, indicators arranged at suitable points along the line, between the works and a certain number of circuit breaker stations.
2. The circuit breaker automatically interrupts the line in its section if the duration of the excessive current exceeds a certain period, which may be different for each circuit breaker. These two functions, although associated, are independent of each other; the indication or signaling is effected at the commencement, and precedes the interruption; its duration varies for each apparatus in accordance with periods which increase in proportion as the circuit breaker station is distant from the indicator and the interruption takes place in accordance with an inverse law, that is to say the periods of disconnection decrease in proportion as the circuit breaker is distant from the indicator.

The invention is illustrated in the accompanying drawing, in which—

Figure 1 is a diagram of a system embodying the same. Fig. 2 shows a circuit breaker station, with its connections to the line and the indicator, and Figs. 3 and 4 show details of the circuit breaker.

Referring to Fig. 1, there are arranged at the heads of the sections A, A¹, A², etc., of the line, circuit breaker stations B, B¹, B², etc., operating an indicator station C. If an accident occurs at D, for example, the transmitters of the stations B and B¹ become operative simultaneously, together with the indicator C whose circuit is closed in parallel by the two devices B and B¹ which may be adjusted respectively for closing the circuit of the indicator for 1 and 2 seconds. At the end of one second, the apparatus B opens its circuit, but the indicator C continues to act until the opening of the circuit of B¹, that is to say for 2 seconds. On stopping, the indicator indicates by means of a special pointer, the time that its operation has continued, whereby the section in which the fault is located is also indicated. The fault having thus been located, two cases may arise; in the first place the cause of the fault may have disappeared in which case the transmitters and indicators return to their initial position, but if the cause persists, all the transmitters continue to operate until the circuit breaker has interrupted the current on the line, that is to say during the entire time that the circuit breaker adjusted for the shortest time takes to act. It is therefore advantageous that it should invariably be the circuit breaker located at the commencement of the faulty section, that is to say the most distant device, which acts and for this reason the most distant circuit breakers are adjusted for acting most rapidly.

In order to render the operation more readily intelligible, I will now describe the circuit breaker station represented in Fig. 2 of the drawing and also its connections with the line and the connections of the latter with the indicator. One of the poles of a source of continuous current 1 is connected with the neutral point 2 of a transformer, and the other pole is earthed at 3 after passing through the winding of an electro-magnet 4, whose armature (when the said electro-magnet is energized) acts upon the pusher 5 of a chronograph 6 with a beat of one quarter, one fifth or any other given fraction of a second; this chronograph constitutes the indicator, and its dial, instead of being graduated in seconds, is divided into sections numbered in correspondence with the several sections of the line. In addition to its ordinary hand 7 it comprises a second hand 8 which is caused to advance by the first, but which remains stationary when the first hand returns to zero. This second hand therefore constantly indicates the maximum displacements of the hand 7 and can only return to zero when acted upon by hand. Any desired number of indicators of this kind can be arranged at suitable points along the line, in accordance with the working conditions.

Each of the transmitter circuit breaker stations receives the current from the source 1 which is sent into the line along a conductor 9 connected with the neutral point of a transformer 10. Safety devices, such as a lightning conductor, a high resistance and a self-induction coil protect the apparatus from the line current. The continuous current supplied by the conductor 9, after having passed between two conducting strips 11 and 12 when they are in contact, is conducted to one of the mercury cups 13, while the other is in communication with an earth plate 15 through the conductor 14. A conducting fork 16 which is normally immersed in the two cups 13, insures the closing of the continuous circuit at this point. The mercury cups 13 and the fork 16 might be replaced by metal contacts with some suitable connecting member. The closing of the continuous current circuit therefore necessitates on the one hand, that the strips 11 and 12 should be in contact and this (as will hereinafter appear) happens only when there is a fault upon the line, and also that the fork 16 shall be immersed in the cups 13.

Each station comprises a battery 17 or other generator of continuous current, whose circuit is closed upon an electro-magnet 18, when ammeters 19, arranged upon the line are traversed by a current of, or exceeding, the critical value. The same battery actuates the electro-magnet 20 controlling the circuit breaker 21 when a fork 22 or other connecting member is immersed in mercury cups 23 or other contact members arranged in series in the circuit of this electro-magnet; this device constitutes the circuit breaker element of the apparatus.

The fork 16 is carried by an insulating arm 24 and the fork 22 by an insulating arm 25, both pivoted upon a pivot 26 depending upon a clockwork movement. When this mechanism is rendered operative it displaces the forks in the direction indicated by the arrow 27, which withdraws the fork 16 from the cups 13 and at the end of a certain time, causes the fork 22 to enter the cups 23.

When a disturbance occurs on the line and the current value becomes excessive, the ammeters 19 close the circuit of the electro-magnet 18, which attracts its armature 28. This armature ends in a fork and serves as an escapement coacting with a pin 29 carried by a shaft 30 driven by a clockwork movement, thus limiting to a semi-revolution the movement of this shaft each time the armature 28 makes an oscillation. The shaft 30 carries a wheel 31 upon which a rod 33 is pivoted at 32, the two positions of this rod, which depend upon those of the armature 28, are represented in Figs. 2 and 4. Fig. 2 represents the position of the mechanism when the armature is at rest, while Fig. 4 represents the position of the same parts when the armature 28 is attracted by the magnet 18. At its other end the rod 33 is pivoted to a lever 34 which is pivoted at 35. The free end of this lever carries a bent rod 36 which normally (Fig. 2) engages a finger 37 carried by the balance 38 of the clockwork movement producing the rotation of the shaft 26 already referred to, and upon which the arms 24 and 25 carrying the forks 16 and 22 are mounted. By means of another rod 39, the rod 33 also controls an arm 40 oscillating about 41 with another arm 42 of insulating material which at once brings into contact the flexible strips 11 and 12 when it is brought into the position represented in Fig. 4, thereby closing upon the electro-magnet 4 of the indicator 6 the continuous current circuit passing through the cups 13. All these functions occur simultaneously and the functioning of the indicator, and also that of the clockwork movement which drives the shaft 26, take place immediately the armature 28 has acted. As it is displaced in the direction indicated by the arrow 27, the fork 16 withdraws progressively from the cups 13 until it leaves them completely, thereby interrupting the continuous circuit and causing the functioning of the indicator to cease. The time occupied by the fork or the connecting member in leaving the mercury, or any other suitable system of metallic contacts, for a given speed of the clockwork, depends upon the length of the arms and upon the level of the mercury or the position of the contacts, and this time can be modified by producing a variation in the height of the cups or the position of the contacts, whereby it is possible to adjust the time exactly to a predetermined duration. When the indicating current has been interrupted and if the cause of the fault persists, the arms continue their movement of rotation until the fork 22, in entering the cups 23, closes the circuit of the electro-magnet 20 which actuates the circuit breaker. The time occupied by the fork 22 in closing this circuit is independent of the period of indication and depends upon the position of the cups 23 the height of which can be modified as desired. As soon as the electro-magnet 20 is energized it causes the circuit breaker 21 to act, thereby interrupting the current in the faulty section. The intensity is thus immediately reduced to its normal value in the ammeters 19 which interrupt the current in the electro-magnet 18. The armature 28 is then at once released and in falling back into its initial position enables the wheel 31 to effect a semi-revolution. The lever 34 is raised and its rod 36 engages the finger 37 of the balance 38 in a position which permits it to re-start immediately when again released. The arm 40 is also pressed back by the rod 39 and returns the rod 42 into a position which releases the two strips 11 and 12. At the same time the said arm presses back a finger 43 mounted upon a sector 44 integral with the arms 24 and 25 and returns the forks 16 and 22 into their initial position in causing the finger 43 to strike against a stop 45 which regulates the stop position of the fork 16. This latter return movement of the arms 24 and 25 is rendered possible by mounting the sector 44 which carries them loose upon the shaft 26 and driving it by the friction of a spring 46 carried by the sector 44 against a disk 47 rigidly connected with the shaft 26 (see Fig. 3). If the cause of the fault should cease before the circuit breaker functions, the ammeters would immediately interrupt the circuit of the electro-magnet 18 and the device as a whole would resume the initial position without the circuit breaker having acted, but the indicator would nevertheless have functioned and notified those concerned that a fault had occurred beyond the station whose indication time is marked on the indicator.

The functioning of the transmitter, of the indicator and of the circuit breaker can be controlled at all times by means of a bell push 48 or some other contact making device branched off the circuit of the ammeters 19 in such a manner as to send the current directly from the battery into the electro-magnet 18 thereby causing the several apparatus to act when desired.

What I claim as my invention and desire to secure by Letters Patent of the United States is:—

1. In apparatus for the purpose set forth the combination with transformers, of means for sending into the line a continuous current passing through the neutral point of the transformers and the earth, an indicating device, a series of switches distributed along the line, severally adapted to close the circuit of said continuous current through said indicating device when said switches are rendered operative by a disturbance in the line, said switches being timed so that the period of indication increases with the distance of the respective switch from the indicator, and a series of main line circuit breakers severally associated with said switches, the period of interruption of the main line by the several circuit breakers decreasing in proportion as the respective circuit breakers are distant from the indicator, and the indicating action being independent of the interruption so that these two operations can take place simultaneously or in succession.

2. In apparatus for the purpose set forth the combination with transformers, of means for sending into the line a continuous current passing through the neutral point of the transformers and the earth, an indicating device, a series of switches distributed along the line, severally adapted to close the circuit of said continuous current through said indicating device when said switches are rendered operative by a disturbance in the line, said switches being timed so that the period of indication increases with the distance of the respective switch from the indicator, and a series of main line circuit breakers severally associated with said switches, the period of interruption of the main line by the several circuit breakers decreasing in proportion as the respective circuit breakers are distant from the indicator, and the indicating action being independent of the interruption so that these two operations can take place simultaneously or in succession, said indicating device comprising a chronograph having a dial with divisions corresponding to sections of the line, a hand, a pusher adapted to actuate said hand, an electro-magnet adapted to actuate said pusher, and an auxiliary hand which records all movements of the first mentioned hand.

3. In apparatus for the purpose set forth the combination with transformers, of means for sending into the line a continuous current passing through the neutral point of the transformers and the earth, an indicating device, and switch stations distributed along the line, severally adapted to close the circuit of said continuous current through said indicating device and to break the main line circuit, the switch devices at said station being timed so that the period of indication increases with the distance of the respective station from the indicator, the period of interruption of the circuit decreasing in proportion as the stations are distant, and the indicating action being independent of the interruption so that these two operations can take place simultaneously or in succession, each switch station comprising an ammeter connected to the line, a local circuit including an electro-magnet and adapted to be closed by said ammeter, an electro-magnetic main line circuit breaker, and a clockwork adapted to be released by the electro-magnet in said local circuit, and a switch actuated by said clockwork, adapted to first close and then break the continuous current circuit, and then switch current from the local circuit into the electro-magnet of the circuit breaker, all the members returning to normal position on cessation of disturbance in the line.

4. In apparatus for the purpose set forth, the combination with transformers, of means for sending into the line a continuous current passing through the neutral point of the transformers and the earth, an indicating device, and switch stations distributed along the line, severally adapted to close the circuit of said continuous current through said indicating device and to break the main line circuit, the switch devices at said stations being timed so that the period of indication increases with the distance of the respective station from the indicator, the period of interruption of the circuit decreasing in proportion as the stations are distant, and the indicating action being independent of the interruption so that these two operations can take place simultaneously or in succession, each switch station comprising an ammeter connected to the line, a local circuit including an electro-magnet and adapted to be closed by said ammeter, an electro-magnetic main line circuit breaker, a clockwork adapted to be released by the electro-magnet in said local circuit, and a switch actuated by said clockwork, adapted to first close and then break the continuous current circuit, and then switch current from the local circuit into the electro-magnet of the circuit breaker, all the members returning to normal position on cessation of disturbance in the line, the release of the clockwork movement being produced by a lever operated by an auxiliary mechanism, the said lever releasing the balance of the principal mechanism and acting by means of a rocking arm upon contacts closing the continuous circuit, the clockwork movement thus released displacing arms carrying connecting members, one closing the continuous current circuit upon the indicator and interrupting it at the end of a given period which can be adjusted as desired, the other closing the circuit of the main line circuit breaker at the end of a different period of time also predetermined and adjustable at will.

In witness whereof I have signed this specification in the presence of two witnesses.

ERNEST BAILLAT.

Witnesses:
 JEAN GERMAIN,
 MARIUS MANNEZ.

Copies of this patent may be obtained for five cents each, by addressing the "Commissioner of Patents, Washington, D. C."